(12) United States Patent
Uzun et al.

(10) Patent No.: US 9,531,679 B2
(45) Date of Patent: Dec. 27, 2016

(54) CONTENT-BASED TRANSPORT SECURITY FOR DISTRIBUTED PRODUCERS

(71) Applicant: Palo Alto Research Center Incorporated, Palo Alto, CA (US)

(72) Inventors: Ersin Uzun, Campbell, CA (US); Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 214 days.

(21) Appl. No.: 14/174,729

(22) Filed: Feb. 6, 2014

(65) Prior Publication Data

US 2015/0222603 A1  Aug. 6, 2015

(51) Int. Cl.
*H04L 29/06* (2006.01)
*H04L 9/08* (2006.01)
(Continued)

(52) U.S. Cl.
CPC ......... *H04L 63/0428* (2013.01); *H04L 9/0816* (2013.01); *H04L 9/3247* (2013.01);
(Continued)

(58) Field of Classification Search
CPC ..... H04L 9/3247; H04L 45/306; H04L 49/355
See application file for complete search history.

(56) References Cited

U.S. PATENT DOCUMENTS 4,309,569 A   1/1982 Merkle
4,921,898 A   5/1990 Lenney
(Continued)

FOREIGN PATENT DOCUMENTS

DE   1720277 A1   6/1967
DE   19620817 A1  11/1997
(Continued)

OTHER PUBLICATIONS

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
(Continued)

*Primary Examiner* — Yin-Chen Shaw
*Assistant Examiner* — Darshan Dhruv
(74) *Attorney, Agent, or Firm* — Shun Yao; Park, Vaughan, Fleming & Dowler LLP

(57) ABSTRACT

A content-producing computer system can use a locally generated key or a client-generated key to communicate with a client device during a session over a named-data network. During operation, the computer system can receive an Interest packet that includes a name for a piece of data or a service. The Interest's name can include a routable prefix, a session identifier, and an encrypted suffix. In some embodiments, the system can generating a session key based on the session identifier and a secret value, and decrypts the encrypted suffix using the session key to obtain a plaintext suffix. The system processes the plaintext suffix to obtain data requested by the Interest, and encrypts the data using the session key. In some other embodiments, the system can use a local private key to decrypt the encrypted suffix, and uses an encryption key obtained from the Interest to encrypt the Content Object.

14 Claims, 14 Drawing Sheets

(51) Int. Cl.
*H04L 9/32* (2006.01)
*H04L 29/08* (2006.01)

(52) U.S. Cl.
CPC .......... *H04L 63/062* (2013.01); *H04L 67/327* (2013.01); *H04L 67/146* (2013.01)

(56) References Cited

U.S. PATENT DOCUMENTS

| | | | |
|---|---|---|---|
| 5,070,134 A | 12/1991 | Oyamada | |
| 5,110,856 A | 5/1992 | Oyamada | |
| 5,629,370 A | 5/1997 | Freidzon | |
| 5,870,605 A | 2/1999 | Bracho | |
| 6,052,683 A | 4/2000 | Irwin | |
| 6,085,320 A * | 7/2000 | Kaliski, Jr. | G06F 21/33 713/168 |
| 6,091,724 A | 7/2000 | Chandra | |
| 6,173,364 B1 | 1/2001 | Zenchelsky | |
| 6,226,618 B1 | 5/2001 | Downs | |
| 6,233,617 B1 * | 5/2001 | Rothwein | H04L 29/06 709/227 |
| 6,233,646 B1 | 5/2001 | Hahm | |
| 6,332,158 B1 | 12/2001 | Risley | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,772,333 B1 | 8/2004 | Brendel | |
| 6,917,985 B2 | 7/2005 | Madruga | |
| 6,968,393 B1 | 11/2005 | Chen | |
| 6,981,029 B1 | 12/2005 | Menditto | |
| 7,013,389 B1 | 3/2006 | Srivastava | |
| 7,031,308 B2 | 4/2006 | Garcia-Luna-Aceves | |
| 7,257,837 B2 | 8/2007 | Xu | |
| 7,287,275 B2 | 10/2007 | Moskowitz | |
| 7,315,541 B1 | 1/2008 | Housel | |
| 7,350,229 B1 | 3/2008 | Lander | |
| 7,382,787 B1 | 6/2008 | Barnes | |
| 7,430,755 B1 * | 9/2008 | Hughes | H04L 63/0823 726/3 |
| 7,444,251 B2 | 10/2008 | Nikovski | |
| 7,496,668 B2 | 2/2009 | Hawkinson | |
| 7,509,425 B1 | 3/2009 | Rosenberg | |
| 7,543,064 B2 | 6/2009 | Juncker | |
| 7,552,233 B2 | 6/2009 | Raju | |
| 7,555,563 B2 | 6/2009 | Ott | |
| 7,567,547 B2 | 7/2009 | Mosko | |
| 7,580,971 B1 | 8/2009 | Gollapudi | |
| 7,623,535 B2 | 11/2009 | Guichard | |
| 7,647,507 B1 | 1/2010 | Feng | |
| 7,685,290 B2 | 3/2010 | Satapati | |
| 7,698,463 B2 | 4/2010 | Ogier | |
| 7,801,177 B2 | 9/2010 | Luss | |
| 7,816,441 B2 | 10/2010 | Elizalde | |
| 7,831,733 B2 | 11/2010 | Sultan | |
| 7,908,337 B2 | 3/2011 | Garcia-Luna-Aceves | |
| 8,000,267 B2 | 8/2011 | Solis | |
| 8,010,691 B2 | 8/2011 | Kollmansberger | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,224,985 B2 | 7/2012 | Takeda | |
| 8,271,578 B2 | 9/2012 | Sheffi | |
| 8,312,064 B1 | 11/2012 | Gauvin | |
| 8,386,622 B2 | 2/2013 | Jacobson | |
| 8,467,297 B2 | 6/2013 | Liu | |
| 8,553,562 B2 | 10/2013 | Allan | |
| 8,572,214 B2 | 10/2013 | Garcia-Luna-Aceves | |
| 8,665,757 B2 | 3/2014 | Kling | |
| 8,667,172 B2 | 3/2014 | Ravindran | |
| 8,699,350 B1 | 4/2014 | Kumar | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,817,594 B2 | 8/2014 | Gero | |
| 8,826,381 B2 | 9/2014 | Kim | |
| 2002/0010795 A1 | 1/2002 | Brown | |
| 2002/0048269 A1 | 4/2002 | Hong | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0176404 A1 | 11/2002 | Girard | |
| 2002/0199014 A1 | 12/2002 | Yang | |
| 2003/0046437 A1 | 3/2003 | Eytchison | |
| 2003/0051100 A1 | 3/2003 | Patel | |
| 2003/0074472 A1 | 4/2003 | Lucco | |
| 2003/0140257 A1 | 7/2003 | Peterka | |
| 2003/0229892 A1 * | 12/2003 | Sardera | H04N 7/17309 725/9 |
| 2004/0024879 A1 | 2/2004 | Dingman | |
| 2004/0030602 A1 | 2/2004 | Rosenquist | |
| 2004/0139230 A1 | 7/2004 | Kim | |
| 2004/0221047 A1 | 11/2004 | Grover | |
| 2004/0252683 A1 | 12/2004 | Kennedy | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0074001 A1 | 4/2005 | Mattes | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0259637 A1 | 11/2005 | Chu | |
| 2005/0262217 A1 | 11/2005 | Nonaka | |
| 2005/0289222 A1 | 12/2005 | Sahim | |
| 2006/0010249 A1 | 1/2006 | Sabesan | |
| 2006/0051055 A1 | 3/2006 | Ohkawa | |
| 2006/0099973 A1 | 5/2006 | Nair | |
| 2006/0129514 A1 | 6/2006 | Watanabe | |
| 2006/0133343 A1 | 6/2006 | Huang | |
| 2006/0173831 A1 | 8/2006 | Basso | |
| 2006/0193295 A1 | 8/2006 | White | |
| 2006/0215684 A1 | 9/2006 | Capone | |
| 2006/0223504 A1 | 10/2006 | Ishak | |
| 2007/0019619 A1 | 1/2007 | Foster | |
| 2007/0073888 A1 | 3/2007 | Madhok | |
| 2007/0112880 A1 | 5/2007 | Yang | |
| 2007/0124412 A1 | 5/2007 | Narayanaswami | |
| 2007/0127457 A1 | 6/2007 | Mirtorabi | |
| 2007/0189284 A1 | 8/2007 | Kecskemeti | |
| 2007/0195765 A1 | 8/2007 | Heissenbuttel | |
| 2007/0204011 A1 | 8/2007 | Shaver | |
| 2007/0209067 A1 | 9/2007 | Fogel | |
| 2007/0239892 A1 | 10/2007 | Ott | |
| 2007/0245034 A1 | 10/2007 | Retana | |
| 2007/0253418 A1 | 11/2007 | Shiri | |
| 2007/0255699 A1 | 11/2007 | Sreenivas | |
| 2007/0255781 A1 | 11/2007 | Li | |
| 2008/0005056 A1 | 1/2008 | Stelzig | |
| 2008/0010366 A1 | 1/2008 | Duggan | |
| 2008/0046340 A1 | 2/2008 | Brown | |
| 2008/0101357 A1 | 5/2008 | Iovanna | |
| 2008/0107034 A1 | 5/2008 | Jetcheva | |
| 2008/0123862 A1 | 5/2008 | Rowley | |
| 2008/0133755 A1 | 6/2008 | Pollack | |
| 2008/0159271 A1 | 7/2008 | Kutt | |
| 2008/0186901 A1 | 8/2008 | Itagaki | |
| 2008/0200153 A1 | 8/2008 | Fitzpatrick | |
| 2008/0215669 A1 | 9/2008 | Gaddy | |
| 2008/0270618 A1 | 10/2008 | Rosenberg | |
| 2008/0287142 A1 | 11/2008 | Keighran | |
| 2008/0288580 A1 | 11/2008 | Wang | |
| 2008/0320148 A1 | 12/2008 | Capuozzo | |
| 2009/0013324 A1 | 1/2009 | Gobara | |
| 2009/0022154 A1 | 1/2009 | Kiribe | |
| 2009/0024641 A1 | 1/2009 | Quigley | |
| 2009/0030978 A1 | 1/2009 | Johnson | |
| 2009/0037763 A1 | 2/2009 | Adhya | |
| 2009/0052660 A1 | 2/2009 | Chen | |
| 2009/0077184 A1 | 3/2009 | Brewer | |
| 2009/0097631 A1 | 4/2009 | Gisby | |
| 2009/0103515 A1 | 4/2009 | Pointer | |

(56) References Cited

U.S. PATENT DOCUMENTS

| | | |
|---|---|---|
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0228593 A1 | 9/2009 | Takeda |
| 2009/0268905 A1 | 10/2009 | Matsushima |
| 2009/0287835 A1 | 11/2009 | Jacobson |
| 2009/0288143 A1* | 11/2009 | Stebila .......... G06F 21/445 726/3 |
| 2009/0288163 A1* | 11/2009 | Jacobson .......... G06F 15/173 726/22 |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0046546 A1 | 2/2010 | Ram |
| 2010/0057929 A1 | 3/2010 | Merat |
| 2010/0088370 A1 | 4/2010 | Wu |
| 2010/0098093 A1 | 4/2010 | Ejzak |
| 2010/0103870 A1 | 4/2010 | Garcia-Luna-Aceves |
| 2010/0124191 A1 | 5/2010 | Vos |
| 2010/0131660 A1 | 5/2010 | Dec |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0195653 A1 | 8/2010 | Jacobson |
| 2010/0195654 A1 | 8/2010 | Jacobson |
| 2010/0195655 A1 | 8/2010 | Jacobson |
| 2010/0232402 A1 | 9/2010 | Przybysz |
| 2010/0232439 A1 | 9/2010 | Dham |
| 2010/0235516 A1 | 9/2010 | Nakamura |
| 2010/0250939 A1 | 9/2010 | Adams |
| 2010/0268782 A1 | 10/2010 | Zombek |
| 2010/0284309 A1 | 11/2010 | Allan |
| 2010/0284404 A1 | 11/2010 | Gopinath |
| 2011/0022812 A1 | 1/2011 | vanderLinden |
| 2011/0055392 A1 | 3/2011 | Shen |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0219427 A1* | 9/2011 | Hito .......... G06F 21/00 726/3 |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1* | 10/2011 | Ronda .......... H04L 63/0853 726/6 |
| 2011/0271007 A1 | 11/2011 | Wang |
| 2011/0286457 A1 | 11/2011 | Ee |
| 2011/0286459 A1 | 11/2011 | Rembarz |
| 2011/0299454 A1 | 12/2011 | Krishnaswamy |
| 2012/0011551 A1 | 1/2012 | Levy |
| 2012/0036180 A1 | 2/2012 | Thornton |
| 2012/0066727 A1 | 3/2012 | Nozoe |
| 2012/0114313 A1 | 5/2012 | Phillips |
| 2012/0120803 A1 | 5/2012 | Farkas |
| 2012/0136936 A1 | 5/2012 | Quintuna |
| 2012/0136945 A1 | 5/2012 | Lee |
| 2012/0141093 A1 | 6/2012 | Yamaguchi |
| 2012/0155464 A1 | 6/2012 | Kim |
| 2012/0158973 A1 | 6/2012 | Jacobson |
| 2012/0179653 A1 | 7/2012 | Araki |
| 2012/0221150 A1 | 8/2012 | Arensmeier |
| 2012/0224487 A1 | 9/2012 | Hui |
| 2012/0290669 A1 | 11/2012 | Parks |
| 2012/0290919 A1 | 11/2012 | Melnyk |
| 2012/0291102 A1 | 11/2012 | Cohen |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0219081 A1 | 8/2013 | Qian |
| 2013/0223237 A1 | 8/2013 | Hui |
| 2013/0242996 A1 | 9/2013 | Varvello |
| 2013/0282854 A1 | 10/2013 | Jang |
| 2013/0282860 A1 | 10/2013 | Zhang |
| 2013/0282920 A1* | 10/2013 | Zhang .......... H04L 45/74 709/238 |
| 2013/0304937 A1 | 11/2013 | Lee |
| 2013/0329696 A1 | 12/2013 | Xu |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1* | 2/2014 | Fort .......... G06F 21/34 713/182 |
| 2014/0074730 A1 | 3/2014 | Arensmeier |
| 2014/0082135 A1 | 3/2014 | Jung |
| 2014/0089454 A1 | 3/2014 | Jeon |
| 2014/0129736 A1 | 5/2014 | Yu |
| 2014/0172981 A1 | 6/2014 | Kim |
| 2014/0173034 A1 | 6/2014 | Liu |
| 2014/0195328 A1 | 7/2014 | Ferens |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0282816 A1 | 9/2014 | Xie |
| 2014/0289325 A1 | 9/2014 | Solis |
| 2014/0289790 A1 | 9/2014 | Wilson |
| 2015/0006896 A1* | 1/2015 | Franck .......... H04L 63/04 713/171 |
| 2015/0039890 A1* | 2/2015 | Khosravi .......... H04L 9/0841 713/171 |

FOREIGN PATENT DOCUMENTS

| | | |
|---|---|---|
| EP | 0295727 A2 | 12/1988 |
| EP | 0757065 A2 | 7/1996 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

B. Lynn. The Pairing-Based Cryptography Library, http://crypto.stanford.edu/pbc/.

C. Gentry and A. Silverberg. Hierarchical ID-Based Cryptography. Advances in Cryptology—ASIACRYPT 2002. Springer Berlin Heidelberg (2002).

D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.

D. Boneh and M. Franklin. Identity-Based Encryption from the Weil Pairing. Advances in Cryptology—CRYPTO 2001, vol. 2139, Springer Berlin Heidelberg (2001).

(56) References Cited

OTHER PUBLICATIONS

G. Ateniese, K. Fu, M. Green, and S. Hohenberger. Improved Proxy Reencryption Schemes with Applications to Secure Distributed Storage. In the 12th Annual Network and Distributed System Security Symposium (2005).

H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management using Broadcast Encryption. Proceedings of the IEEE 92.6 (2004).

J. Shao and Z. Cao. CCA-Secure Proxy Re-Encryption without Pairings. Public Key Cryptography. Springer Lecture Notes in Computer Science vol. 5443 (2009).

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/documents/Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Jacobson, Van et al. 'VoCCN: Voice Over Content-Centric Networks.' Dec. 1, 2009. ACM ReArch'09.

Rosenberg, J. "Interactive Connectivity Establishment (ICCE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks,' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

(56) References Cited

OTHER PUBLICATIONS

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees.". Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.

(56) References Cited

OTHER PUBLICATIONS

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans. on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N. E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOMM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazine, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Xie et al. "Collaborative Forwarding and Caching in Content Centric Networks", Networking 2012.
Amadeo et al. "Design and Analysis of a Transport-Level Solution for Content-Centric Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

\* cited by examiner

CONTENT-BASED TRANSPORT SECURITY FOR DISTRIBUTED PRODUCERS

RELATED APPLICATION

The subject matter of this application is related to the subject matter in a co-pending non-provisional application by the same inventors as the instant application and filed on the same day as the instant application entitled "CONTENT-BASED TRANSPORT SECURITY," having Ser. No. 14/174,681, and filing date Feb. 6, 2014.

BACKGROUND

Field

This disclosure is generally related to establishing secure network connections. More specifically, this disclosure is related to generating and/or processing Interest and Content Object packets that include an encrypted name suffix.

Related Art

Advancements in computer networks and wireless technologies have made it easier for manufacturers to create Internet-enabled consumer devices. Some of these Internet-enabled devices come in the form of consumer appliances, such as digital thermostats, home-theater equipment, and home security systems. Manufacturers oftentimes provide software applications and/or online services that allow a user to remotely access or configure their devices. Also, many of these devices can auto-discover each other, and can stream data between each other to provide a unified experience for the user. One example is home-entertainment equipment, where a user's laptop or mobile computing device can detect the presence of a television or audio-video receiver (AVR) within a computer network, and can stream content to the television or AVR to present the content to a user.

These Internet-enabled consumer devices can communicate with an online service or with a peer consumer device by establishing a transmission control protocol (TCP) connection over an Internet-protocol (IP) network. Oftentimes, these consumer devices can establish a secure connection that encrypts the user's information by employing a transport layer security (TLS) protocol or a secure socket layer (SSL) protocol that encrypts data before transmitting the data over the IP network.

Unfortunately, the TLS and SSL protocols are specific to IP-based network protocols, and cannot be used to establish a secure connection on other types of computer networks. For example, smartphone and other mobile devices oftentimes switch between different networks within a single day, which makes it difficult to reach a given mobile device when its IP address has changed. To solve this problem, computer scientists are developing a content-centric network (CCN) architecture that allows a computer network to route packets based on the packet's name, and not based on a device's IP address. However, it is not possible to use the TLS or SSL protocol on a CCN network, given that the TLS and SSL protocols require using an IP address to establish the network connection.

SUMMARY

One embodiment provides a content-producing computer system that generates a session key to communicate with a client device during a session over a named-data network. During operation, the computer system can receive an Interest packet that includes a name for a piece of data or a service requested by a client device. The Interest's name can include a routable prefix, a session identifier, and/or an encrypted name suffix. The system can generating a symmetric session key based on the session identifier and a secret value, and decrypts the encrypted name suffix using the session key to obtain a plaintext suffix.

In some embodiments, the system can process the plaintext name to obtain a piece of data that corresponds to the Interest's name, and encrypts the piece of data using the session key. The system can then generate and disseminate a Content Object that includes the encrypted piece of data to satisfy the Interest.

In some embodiments, the system can initiate the session with the client device. To initiate the session, the system can receive a public key or a digital certificate from the client device, and generates a session identifier for the session. The system then generates an encrypted session-setup packet that includes at least the session identifier and the symmetric session key, and includes the remote computer system's certificate. The encrypted session-setup packet is encrypted using the client device's public key, and can be signed according to the digital certificate of the content-producing device. The system sends the encrypted session-setup packet to the client device.

In some embodiments, the system can receive, from the client device, a request for a digital certificate of the content-producing device. In response to receiving the request, the system sends, to the client device, the digital certificate of the content-producing device. Also, the system can initiate the session by receiving a temporary symmetric key from the client device, such that the temporary symmetric key is encrypted using the public key of the content-producing device. The system generates a session identifier for the session, and generates an encrypted session-setup packet that includes at least the session identifier, and the symmetric session key. The encrypted session-setup packet is encrypted using the temporary key from the client device. The system can then send the encrypted session-setup packet to the client device.

In some embodiments, while initiating the session, the system can receive a resume-setup packet that includes the session identifier and a public key certificate of the client device, and decrypts the resume-setup packet using the session key to obtain the client device's public key certificate. The system then authenticates the client device based on the public key certificate.

In some embodiments, the session identifier is signed using a private key of the client device. Also, to authenticate the client device, the system can use the client device's public key to authenticate the signed session identifier.

One embodiment provides a content-producing computer system that uses a client-generated key to communicate with a client device during a session over a named-data network. During operation, the computer system can receive an Interest packet that includes a name for a piece of data or a service requested by a client device, such that the Interest's name can include a routable prefix, a session identifier, and an encrypted name suffix. The system can obtain a decryption key (e.g., a local private key, or a session key), decrypts the encrypted name suffix using the decryption key to obtain a plaintext suffix.

In some embodiments, processes the name suffix to obtain a piece of data that corresponds to the Interest's name. The system obtains a client-device public key from the Interest, and encrypts the piece of data using the client-device public key. The system can then generate and disseminate a Content Object that includes the encrypted piece of data to satisfy the Interest.

In some embodiments, the decryption key includes one or more of: a symmetric session key; and a private asymmetric key.

In some embodiments, while determining the decryption key, the system can generate the decryption key based on one or more of the session identifier and a secret value.

BRIEF DESCRIPTION OF THE FIGURES

In the figures, like reference numerals refer to the same figure elements.

DETAILED DESCRIPTION

Figure 1:
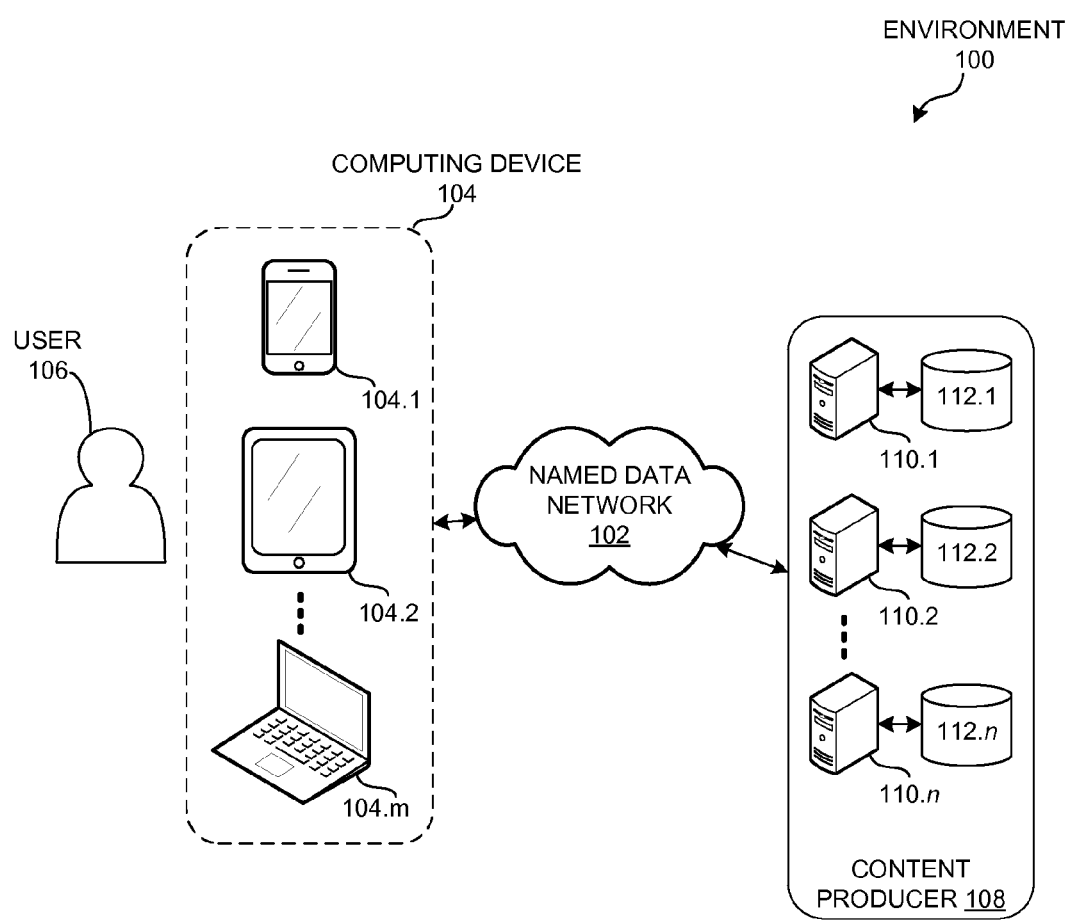
FIG. 1 illustrates an exemplary computer system that facilitates using Interest and Content Objects with encrypted names to protect a user's privacy in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide network devices that solve the problem of protecting a user's privacy by using Interest packets with encrypted names. For example, a client device can establish a session with a remote content producer over a named data network (NDN) to reach an agreement on the keys that each device can use to encrypt and decrypt an Interest's name or a Content Object's payload. Once the session is established, the client device can request a piece of data by encrypting a portion of the name that identifies the data being requested, and disseminating the Interest over the NDN. The Interest's name can include a beginning portion that indicates a routable prefix, which can be used by various network nodes of a named data network to determine how to forward the Interest toward the content producer.

Once the content producer receives the Interest, the content producer can use one of the established keys decrypt the portion of the name that's encrypted to determine the data or service requested by the Interest. In some embodiments, the content producer can obtain a session identifier from the Interest's name, and can use this session identifier to generate a session key on-the-fly. This allows the content producer to establish sessions with a plurality of client devices without having to store session keys. Also, if the content producer deploys a service across multiple server nodes, a session can span multiple server nodes without requiring the content producer to propagate a session's keys toward other server nodes.

The following terms describe elements of a named data network (NDN) architecture, such as a content-centric network (CCN):

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Name: A name in an NDN is typically location independent and uniquely identifies a Content Object. A data-forwarding device can use the name or name prefix to forward an Interest packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which NDN routers can propagate toward a storage device (e.g., a cache server) or a data producer that can provide the requested data to satisfy the request or Interest.

In some embodiments, the NDN system can include a content-centric networking (CCN) architecture. However, the methods disclosed herein are also applicable to other NDN or other information-centric network (ICN) architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

FIG. 1 illustrates an exemplary computer system 100 that facilitates using Interest and Content Objects with encrypted names to protect a user's privacy in accordance with an embodiment. Computing environment 100 can include a named-data network 102 (or any information-centric network now known or later developed), which can include a plurality of routing nodes or network nodes that can forward an Interest packet based on the name of the content being requested by the Interest packet, toward a content producer that can satisfy the Interest.

Computing environment 100 can also include a client device 104, which can include any computing device that can disseminate Interests and receive Content Objects via NDN 102. For example, client device 104 can include a smartphone 104.1, a tablet computer 104.2, and/or a personal computing device 104.m (e.g., a laptop). Specifically, client device 104 can disseminate an Interest that includes an encrypted suffix to protect the privacy of a local user 106.

In some embodiments, computing environment 100 can include a content producer 108 that can host data or services for one or more client devices. For example, content producer 108 can include s set of computing devices 110.1-110.n that each can receive and process Interests for one or more client devices. When a computing device 110 of content producer 108 receives an Interest from client device 104, computing device 110 can generate or retrieve a session key to decrypt the Interest's name. Once computing device 110 has processed the Interest to obtain or generate a Content Object to return to client device 104, computing device 110 uses the session key (or a key provided by client device 104) to encrypt the Content Object before returning the Content Object.

Figure 2:
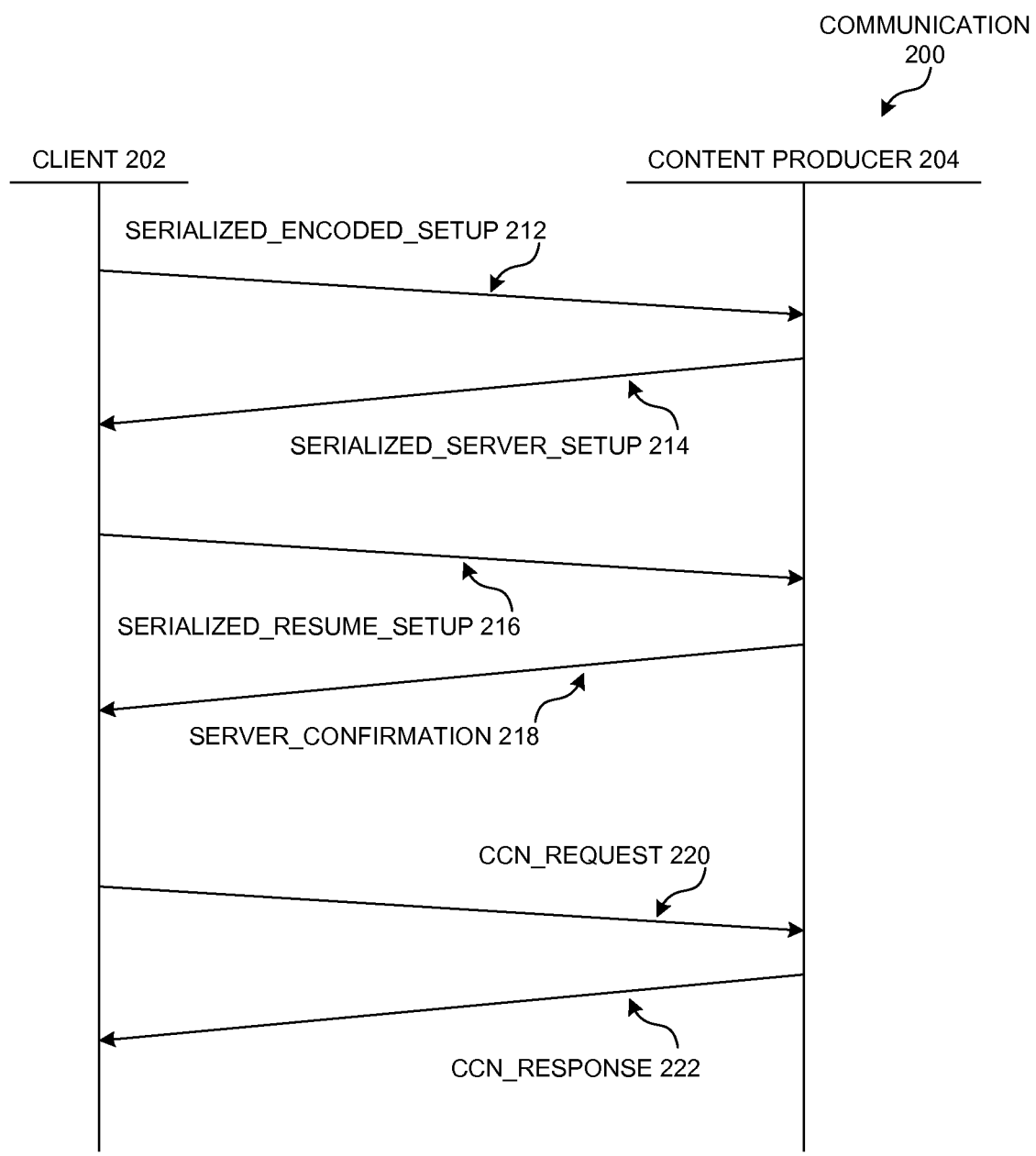
FIG. 2 illustrates exemplary communications between a client device and a content producer in accordance with an embodiment.

FIG. 2 illustrates exemplary communications 200 between a client device 202 and a content producer 204 in accordance with an embodiment. During operation, client device 202 can initiate a session with content producer 204 by disseminating an Interest with a serialized_encoded-_setup message 212, which includes a temporary key. When content producer 204 receives the Interest, content producer 204 can generate a session key and a session identifier, and returns them to client device 202 in a Content Object that includes a serialized_server_setup message 214.

Content producer 204 can also include an authentication request in serialized_server_setup message 214. In response to receiving the authentication request, client device 202 generates a serialized_resume_setup message 216, which includes any information that content producer 204 can use to authenticate client device 202. After authenticating client device 202, content producer 204 can return a Content Object with a server_confirmation message 218 that informs client device 202 that the session has been established.

Once the session is established, client device 202 and content producer 204 have reached an agreement on the keys that each device can use to encrypt and decrypt the name suffix from each other's Interests, and/or to encrypt the payload in a Content Object. Client device 202 can then proceed to disseminate Interests to request data or services from content producer 204, such that the Interests include an encrypted name. Also, content producer 204 can satisfy an Interest by returning a Content Object whose payload is encrypted for client device 202.

Note that a Content Object can include a name for the payload's contents, a metadata block, a signature block, and a payload that includes a piece of data. In some embodiments, content producer 204 can return the information needed to establish or maintain a session within the metadata of a Content Object. For example, content producer 204 can create a Content Object so that the metadata indicates a digital certificate associated with the Content Object's payload. The Content Object's metadata can include the bytes of the digital certificate, or can include a key locator that can be used to retrieve the digital certificate from a trusted entity. This behavior is not possible using typical Internet protocol (IP) sessions, such as over a transport layer security (TLS) protocol or a secure socket layer (SSL) protocol that requires exchanging digital certificates as packet payload data over several iterations.

Initiating a Session

Figure 3:
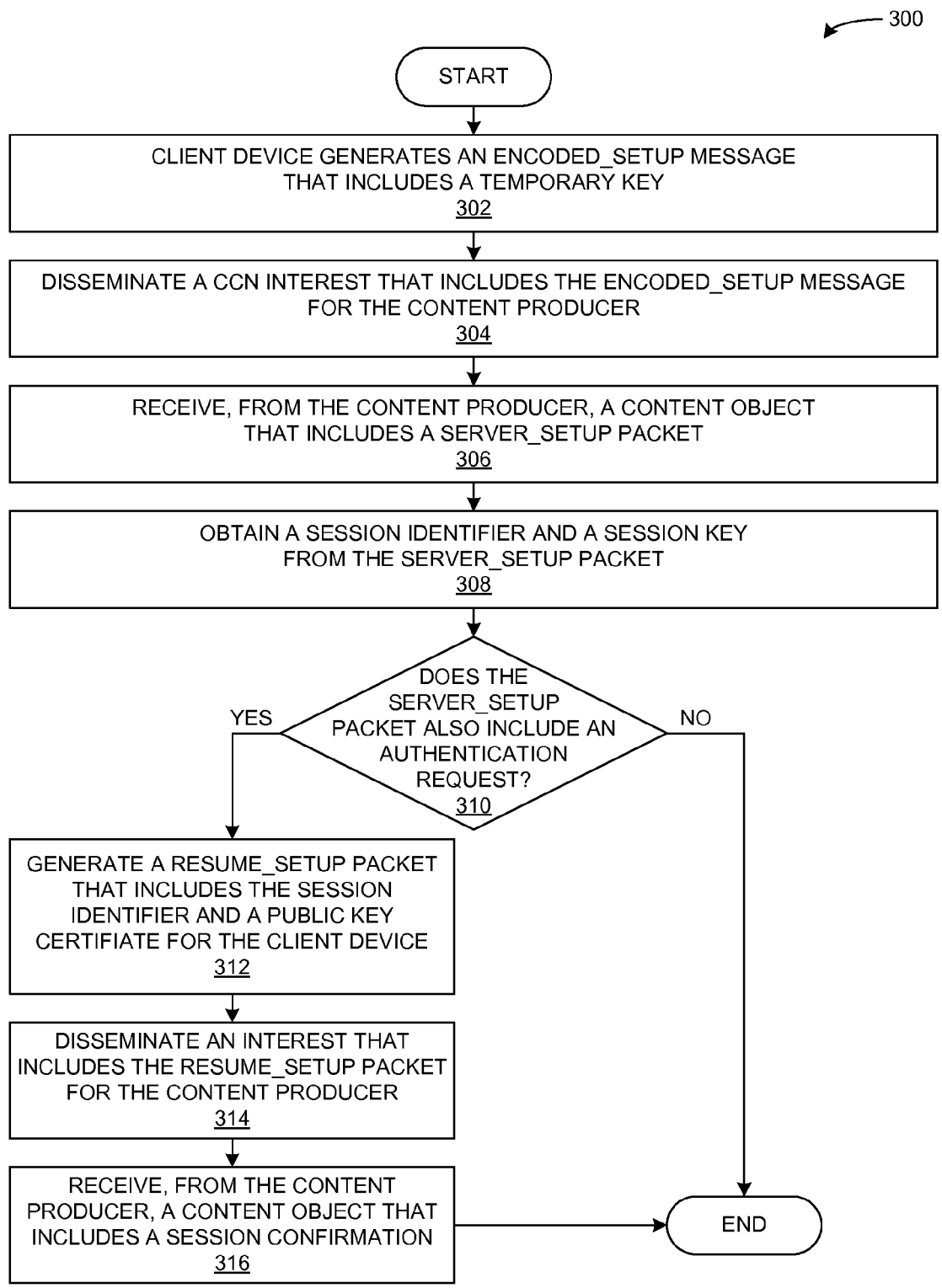
FIG. 3 presents a flow chart illustrating a method for initiating a session with a content producer at a client device in accordance with an embodiment.

FIG. 3 presents a flow chart illustrating a method 300 for initiating a session with a content producer at a client device in accordance with an embodiment. During operation, the client device can generate an encoded_setup message that includes a temporary key (e.g., a symmetric key, or a public key) (operation 302), and generates an Interest that includes the encoded_setup message as an encrypted message. For example, the client device can first send an unencrypted request to the content producer, which requests for the producer's digital certificate. The producer responds to the request by sending its digital certificate to the client device, such as via a Content Object of type "Certificate." If the client device accepts the certificate, the client device obtains the producer's public key from the certificate. The client device then generates the encoded_setup message that includes the temporary key, encrypts the encoded_setup message using the server's public key, and sends the encrypted encoded_setup message (e.g., the encrypted temporary key) to the producer.

In some embodiments, the client device can marshal the encoded_setup message to generate a character stream that includes the encoded_setup message, and appends the marshalled character stream to the Interest's name. The Interest's name can have the form:

/routable_prefix/setup/serialized_encoded_setup     (1)

In expression (1), the name component "/routable_prefix" can include a name prefix or domain associated with the content producer. The name component "setup" indicates a control value, which notifies the content producer that the client device is setting up a session with the content producer. In some embodiments, the encoded_setup message can also include a random number N1 (e.g., a nonce) to ensure the Interest has a unique name so that routing nodes of a named data network don't use a cached object to satisfy the Interest. This allows the Interest to reach the content producer to which the client device desires to initiate a session.

The client device then disseminates the Interest over a named-data network to send the encoded_setup message to the content producer (operation 304). After the content producer processes the Interest, the client device receives a Content Object from the content producer that includes a serialized_server_setup packet (operation 306). The client device can decrypt the serialized_server_setup packet using the temporary key (or a private key that complements a temporary public key), and obtains at least a session identifier and a session key (operation 308). In some embodiments, the serialized_server_setup packet can also include the random number N1, and another random number N2.

Also, in some embodiments, the serialized_server_setup packet can include a message that indicates the handshake is complete, or can include an authentication request for authenticating the client device. Hence, the client device determines whether the serialized_server_setup packet includes an authentication request (operation 310). If the serialized_server_setup packet includes the message stating that the handshake is complete, the session is established between the client device and the content producer, and the client device can proceed to disseminate encrypted Interests for the content producer.

Otherwise, the client device generates a serialized_resume_setup packet that includes the session identifier and a public key certificate for the client device (operation 312), and encrypts the serialized_resume_setup packet using the session key provided by the content producer. The client device generates an Interest that includes the encrypted serialized_resume_setup packet, for example, so that the Interest's name has the form:

/routable_prefix/session_id/serialized_resume_setup     (2)

In expression (2), the name component "setup" includes the session identifier as the control value that the content producer uses to determine how to process the Interest. The serialized_resume_setup packet can include the session identifier, signed with the client's private key. The serialized_resume_setup packet can also include other information that can be used to authenticate the client device, such as the client's public key certificate, and can also include the certificate change.

The client device then disseminates the Interest over a named-data network to send the serialized_resume_setup packet to the content producer (operation 314). The content producer uses the serialized_resume_setup packet to authenticate the client device, and returns a Content Object that specifies the outcome of the authentication. The client device receives the Content Object (operation 316), which either confirms that the session is established, or notifies that the client device could not be authenticated.

Figure 4A:
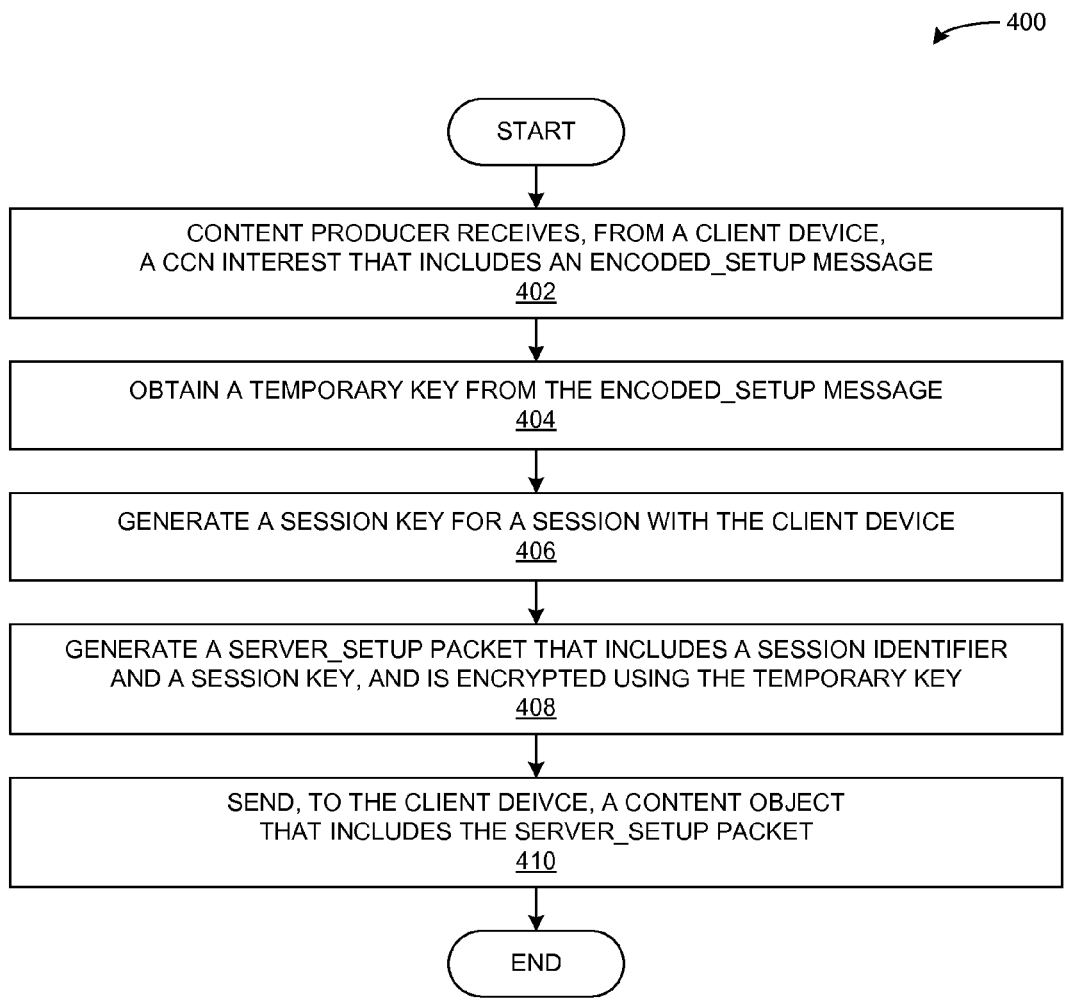
FIG. 4A presents a flow chart illustrating a method for initiating a session with a client device at a content producer in accordance with an embodiment.

FIG. 4A presents a flow chart illustrating a method 400 for initiating a session with a client device at a content producer in accordance with an embodiment. During operation, the content producer receives an Interest that includes the encoded_setup message (operation 402), and obtains a temporary key from the encoded_setup message (operation 404). The content producer then generates a session identifier for a session with the client device, and generates a session key for the session (operation 406).

In some embodiments, the content producer can generate the session key based on the session identifier and a secret. For example, during the session, the client device may disseminate various Interests that request different data or different services from the content producer. However, these Interests may not all arrive at the same server of the content producer that initiated the session with the client device. Also, the content producer may have a plurality of sessions with various client devices, which makes it undesirable to store session keys for all active session. In some embodiments, the server that receives the Interest can generate the session key on-the-fly using the session identifier from the Interest's name, and using the secret that is common across all servers of the content producer.

The content producer then generates a serialized_server_setup packet that includes the session identifier and the session key, and is encrypted using the client device's temporary key (operation 408), and generates a Content Object that includes the encrypted serialized_server_setup packet. The content producer then returns the Content Object to satisfy the client device's Interest (operation 410).

In some embodiments, the content producer can either finish the session-initiating handshake, or can request additional information from the client device to authenticate the client device. For example, if the content producer does not need to authenticate the client device, the content producer can generate the serialized_server_setup packet to include a message that indicates the handshake is complete. On the other hand, if the content producer needs to authenticate the client device, the content producer generates the serialized_server_setup packet to include an authentication request for authenticating the client device. The client device responds to the authentication request by disseminating an Interest that includes a serialized_resume_setup packet for the content producer.

Figure 4B:
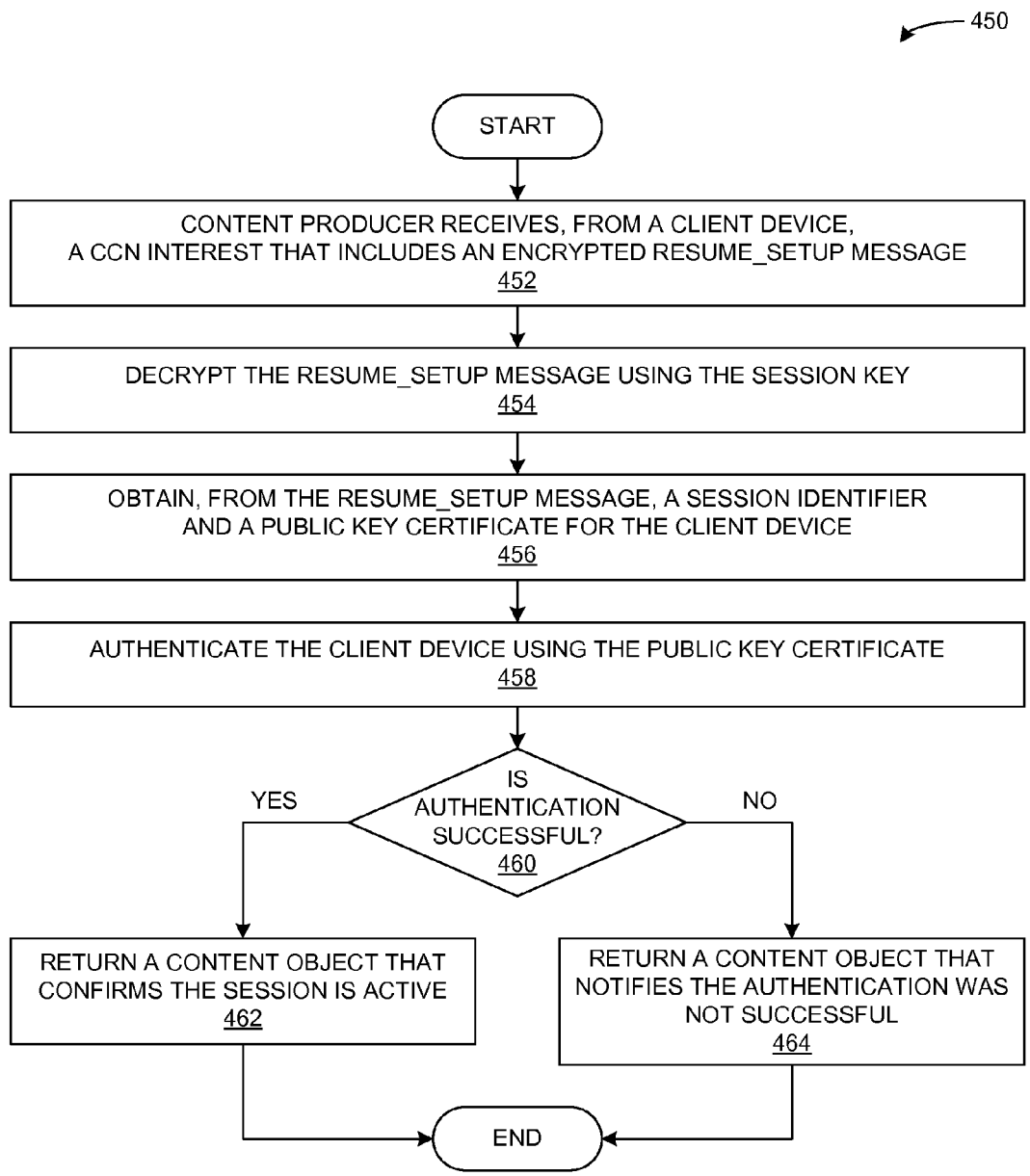
FIG. 4B presents a flow chart illustrating a method for authenticating a client device in accordance with an embodiment.

FIG. 4B presents a flow chart illustrating a method 450 for authenticating a client device in accordance with an embodiment. During operation, the content producer can receive, from the client device, an Interest that includes an encrypted serialized_resume_setup message (operation 452). The content producer then decrypts the serialized_resume_setup message using the session key (operation 454), and obtains a session identifier and/or a public key certificate for the client device (operation 456).

The content producer can authenticate the client device using the signed session identifier, or using the public key certificate (operation 458). For example, recall that the signed session identifier is signed using the client device's private key. The content producer can process the session identifier using the client device's public key to obtain the plaintext session identifier. Alternatively, the content producer can analyze the public key certificate and/or the certificate chain to authenticate the client device.

The content producer then determines whether client authentication was successful (operation 460). If so, the content producer proceeds to return a Content Object that confirms that the session is active (operation 462). Otherwise, if the content producer could not authenticate the client device, the content producer returns a Content Object that includes a message notifying that the authentication was not successful and/or that the session is not active (operation 464).

Using Producer-Generated Symmetric Session Keys

Figure 5A:
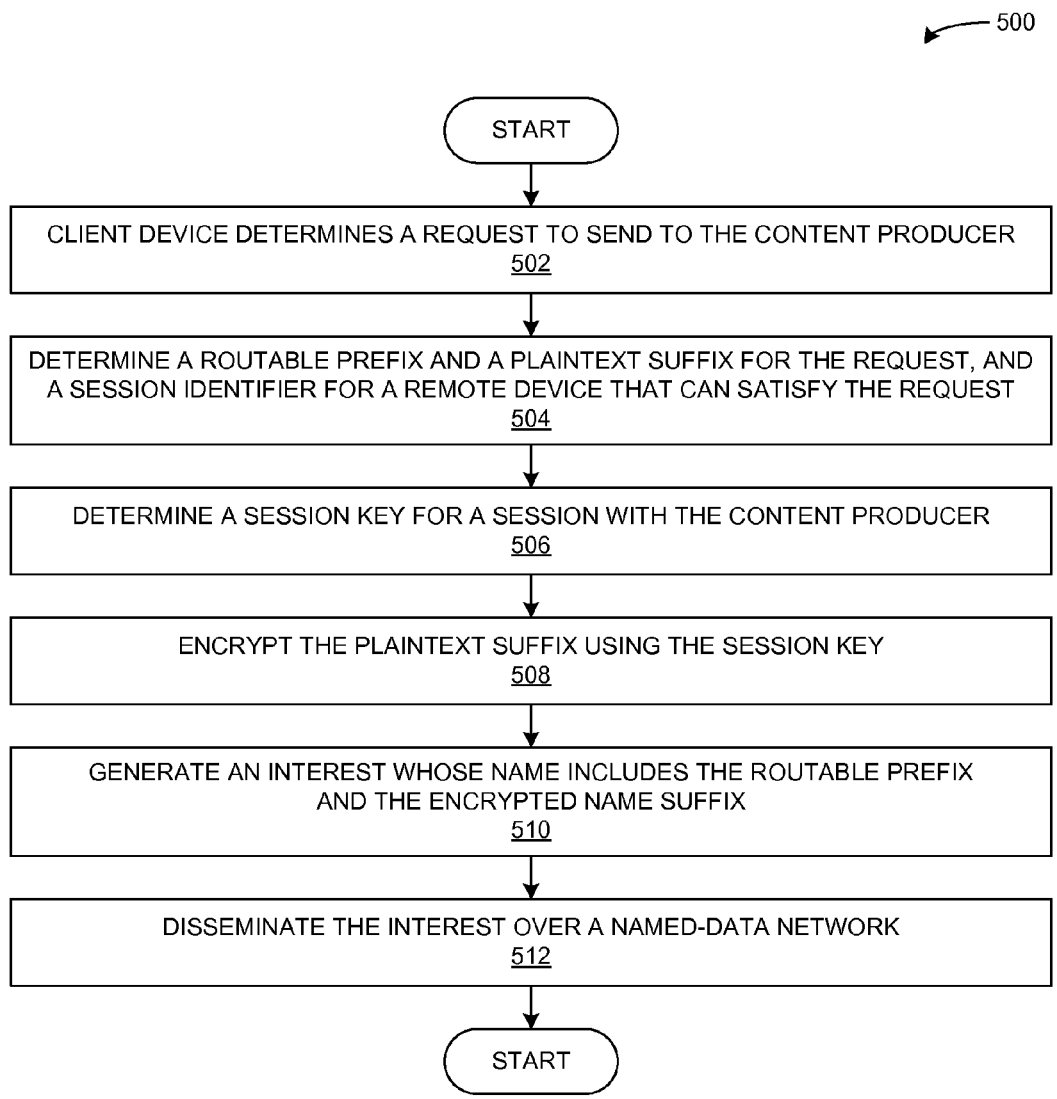
FIG. 5A presents a flow chart illustrating a method for using a producer-generated symmetric session key to generate and disseminate an Interest that includes an encrypted name in accordance with an embodiment.

FIG. 5A presents a flow chart illustrating a method 500 for using a producer-generated symmetric session key to generate and disseminate an Interest that includes an encrypted name in accordance with an embodiment. During operation, the client device can obtain or determine a request to send to the content producer (operation 502). For example, an application running on the client device can generate a request to obtain data for the local user, such that the request includes a name for the data. The name can have the form:

/routable_prefix/session_id/plaintext_suffix    (3)

Alternatively, the application can provide the routable prefix and the plaintext suffix, which the client device can use this information to generate a secure name.

The client device then obtains the components that need to be combined into the Interest's name, which can include the routable prefix, the plaintext suffix, and a session identifier associated with the content producer (operation 504). The client device can determine the session identifier, for example, by performing a lookup operation in a table based on the routable prefix. If a matching entry does not exist, the client device can proceed to initiate or re-establish the session. To generate a secure Interest name, the client device determines a session key that corresponds to the session with the content producer (operation 506), and encrypts the plaintext suffix using the session key (operation 508). The client device can then generate the Interest so that the Interest's name includes the routable prefix and the encrypted name suffix (operation 510). For example, the Interest's name can have the form:

/routable_prefix/session_id/encrypted_suffix    (4)

The client device can disseminate the Interest over a named-data network to obtain the desired content from the content producer (operation 512).

Once the content producer receives the Interest, the content producer can use the session key to decrypt the Interest's encrypted suffix, and can return a Content Object that satisfies the Interest. Note that the Content Object's name also includes the name (4) with the encrypted suffix, and includes a payload encrypted using the session key. The client device can process the Content Object using the session key.

Figure 5B:
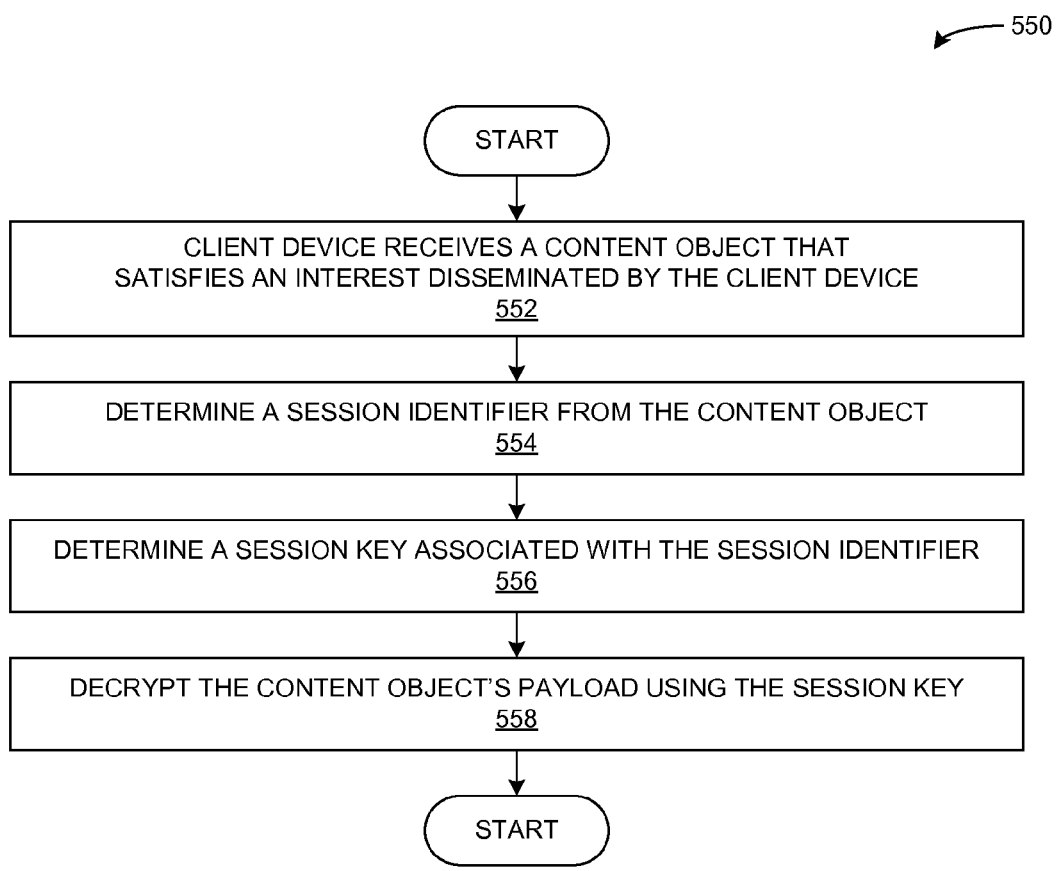
FIG. 5B presents a flow chart illustrating a method for using the symmetric session key to process a Content Object that includes an encrypted name in accordance with an embodiment.

FIG. 5B presents a flow chart illustrating a method 550 for using the symmetric session key to process a Content Object that includes an encrypted name in accordance with an embodiment. Specifically, the client device can receive a Content Object that satisfies an Interest that was disseminated by the client device (operation 552). When the client device receives the Content Object, the client device can use the Content Object's encrypted name to determine which application generated the initial request for the Interest. The client device can also decrypt the Content Object's payload by obtaining a session identifier from the Content Object's name (operation 554), and using the session identifier to determine a session key that corresponds to the Content Object (operation 556). The client device decrypts the Content Object's payload using the session key (operation 558).

In some embodiments, the client device can also use the session key to regenerate the Content Object's plaintext name. For example, the client device can use the session key to decrypt the encrypted suffix, and replaces the encrypted suffix in the Content Object's name with the plaintext suffix. The Content Object's plaintext name has the form presented in expression (3).

Figure 6A:
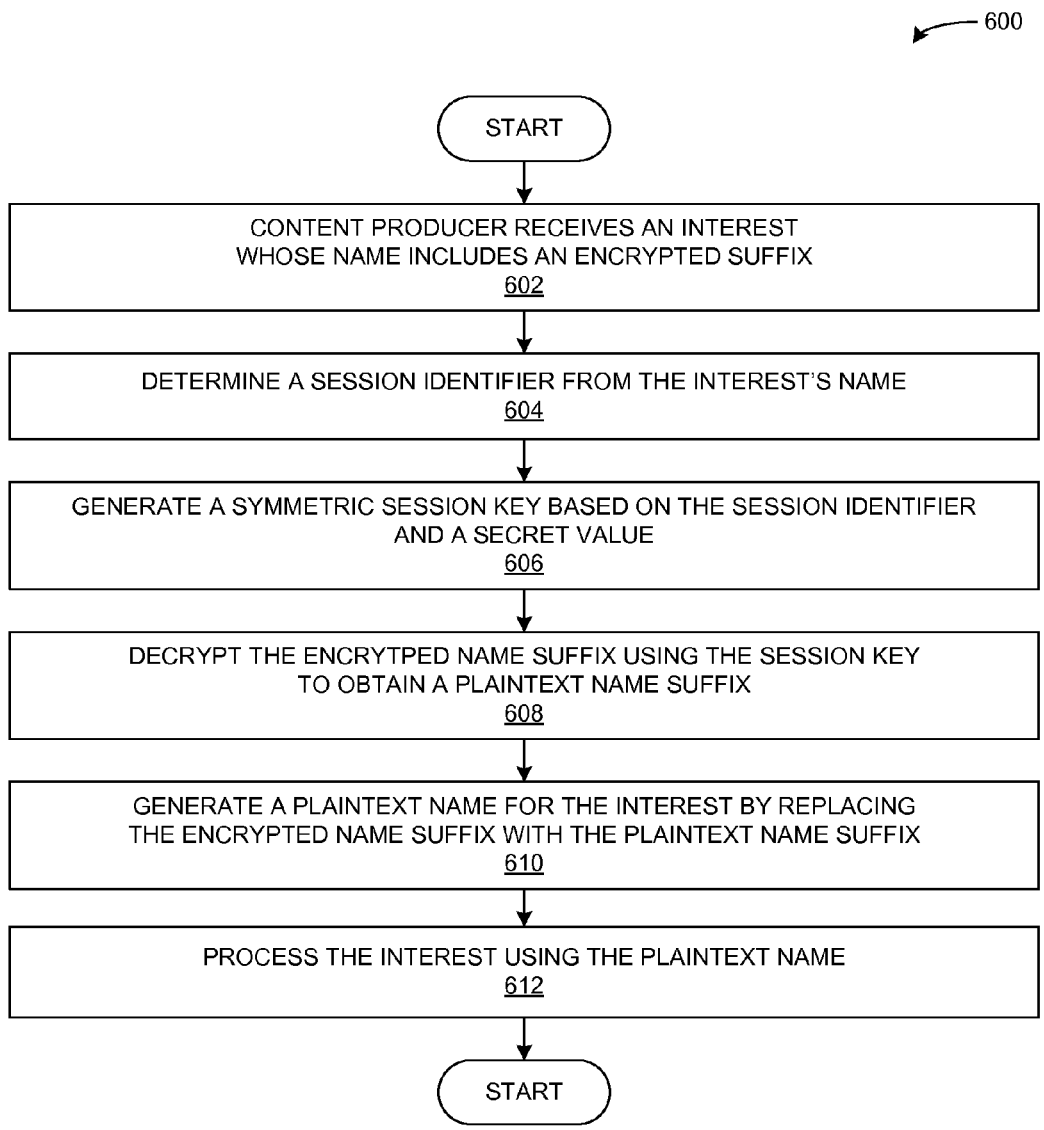
FIG. 6A presents a flow chart illustrating a method for using the symmetric session key at the content producer to process an Interest that includes an encrypted name in accordance with an embodiment.

FIG. 6A presents a flow chart illustrating a method 600 for using the symmetric session key at the content producer to process an Interest that includes an encrypted name in accordance with an embodiment. During operation, the content producer can receive an Interest that includes a name with an encrypted suffix (operation 602). The Content Object's name can include a name having the form presented in expression (4), which includes a routable prefix, a session identifier, and an encrypted name suffix.

Recall that the content producer may maintain active sessions for a plurality of users, whose requests may arrive at any of the content producer's various server computers. This makes it inefficient to have each server computer store the set of possible session keys for all active user sessions. In some embodiments, the content producer's severs can generate the session key on-the-fly based on the Interest's session identifier. The content producer determines a session identifier from the Interest's name (operation 604), and generates a symmetric key based on the session identifier and a secret value (operation 606). For example, the content producer can use a function:

session_key=$f$(session_id,secret)    (5)

In expression (5), function $f( )$ can include any function that generates a cryptographic key, such as a hash function. The secret can include any number or character sequence that is common to one or more devices associated with the content producer. This way, any of the content producer's devices can obtain a session key for any active session without having to store a session key. The secret can be persistent over a period of time (e.g., a month, a year, etc.), and can be used across various sessions with a plurality of client devices.

The content producer then decrypts the encrypted suffix using the session key to obtain a plaintext suffix (operation 608), and can also generate a plaintext name for the Interest by replacing the encrypted suffix with the plaintext suffix (operation 610). The plaintext name can have the form of expression (3). The content producer can process the Interest using the plaintext suffix, or using the plaintext name (operation 612).

For example, the content producer can perform a lookup operation in a local FIB using the plaintext name to determine a local application that can retrieve or generate a Content Object that satisfies the Interest. Alternatively or additionally, the content producer or a local application can use the plaintext suffix to determine the data or service being requested by the client device. Once the content producer or a local application has retrieved or generated a piece of data requested by the Interest, the content producer can generate and return a Content Object to satisfy the Interest.

Figure 6B:
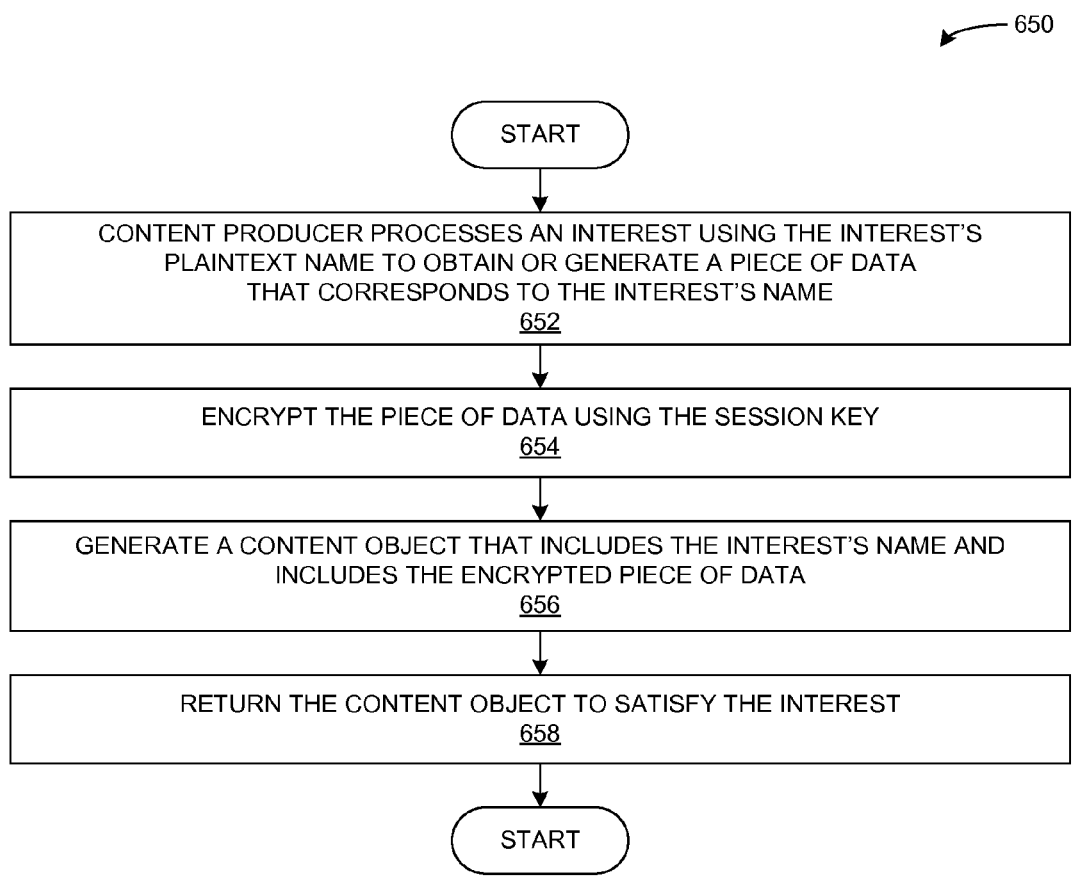
FIG. 6B presents a flow chart illustrating a method for using the symmetric session key to generate and return a Content Object that includes an encrypted name in accordance with an embodiment.

FIG. 6B presents a flow chart illustrating a method for using the symmetric session key to generate and return a Content Object that includes an encrypted name in accordance with an embodiment. During operation, the content producer can process the Interest using the Interest's plaintext name or plaintext prefix to obtain or generate a piece of data that corresponds to the Interest's name (operation 652). The content producer then encrypts the piece of data using the session key that corresponds to the user session (operation 654), and generates a Content Object that includes the Interest's name and includes the encrypted piece of data (operation 656).

Note that the Content Object's name includes the name from the Interest, which includes the encrypted suffix and has a form presented under expression (4). This allows routing nodes along a path traversed by the Interest to use the Content Object's name to find a matching entry in a local PIT, and to return the Content Object via an interface specified by the matching PIT entry. The content producer then returns the Content Object to satisfy the Interest (operation 658).

Using Runtime-Generated Client Keys

Figure 7A:
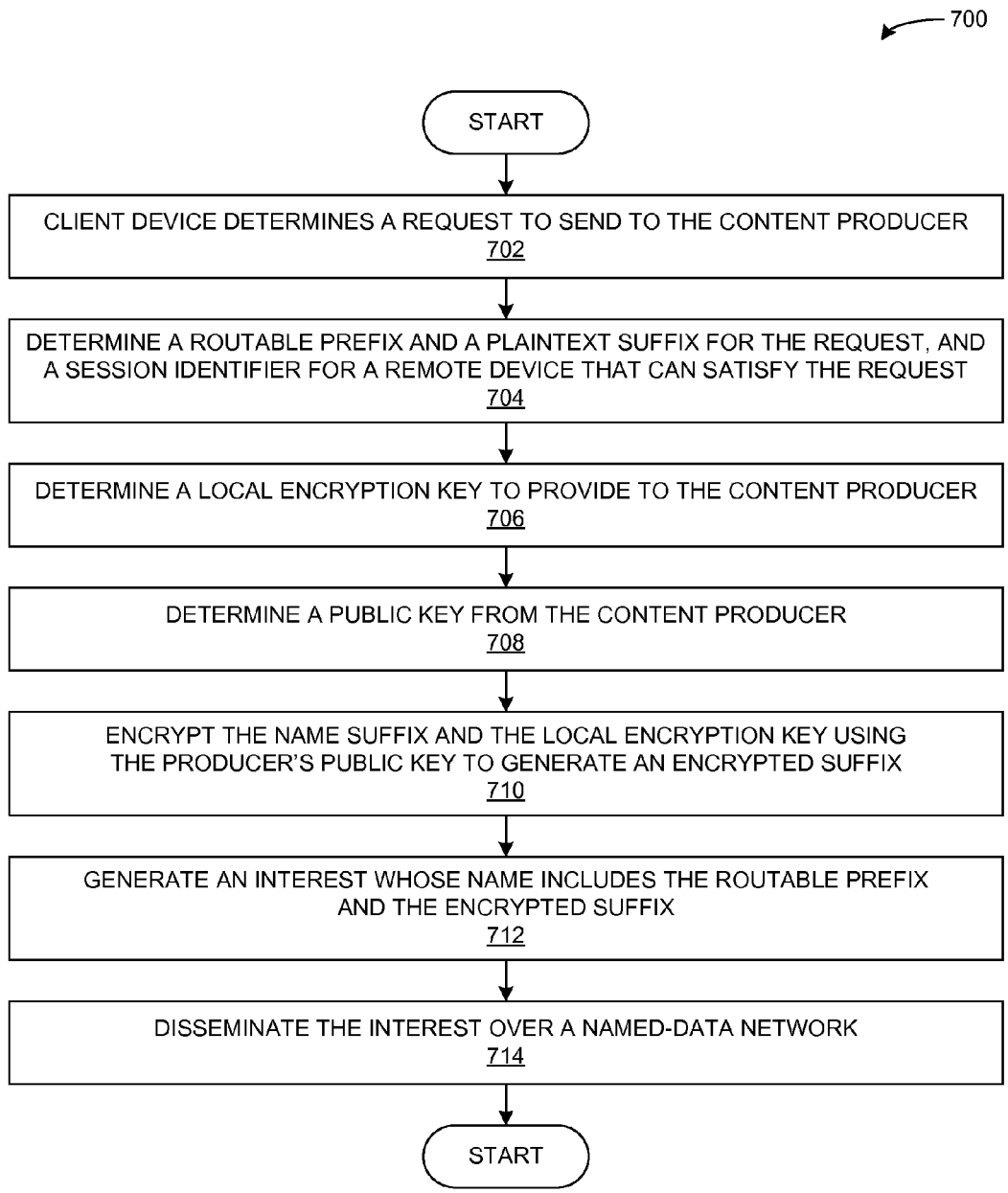
FIG. 7A presents a flow chart illustrating a method performed by a content producer to use a producer-generated public key to generate and disseminate an Interest that includes an encrypted name in accordance with an embodiment.

FIG. 7A presents a flow chart illustrating a method 700 performed by a content producer to use a producer-generated public key to generate and disseminate an Interest that includes an encrypted name in accordance with an embodiment. During operation, the client device can obtain or determine a request to send to the content producer (operation 702), and generates or determines a routable prefix, a session identifier, and a plaintext suffix for the request (operation 704). The client device also determines an encryption key to provide to the content producer (operation 706), which the content producer can use to encrypt a Content Object's payload before returning the Content Object to satisfy the client device's Interest. In some embodiments, the client device may store the encryption key for the session, and provides the encryption key to the content producer within each Interest.

In some other embodiments, the client device does not store keys for active sessions. Rather, the client device can generate the keys at runtime as necessary. For example, the client device can generate a session key using a function:

$$\text{session\_key} = f_{session}(\text{session\_id}, \text{secret}) \quad (6)$$

If the client device is configured to use a public/private key pair, the client device can generate the public key using a function:

$$\text{public\_key} = f_{public}(\text{session\_id}, \text{secret}) \quad (7)$$

Once the client device receives a Content Object from the content producer, the client device can use another hash function to generate the corresponding private key to decrypt the Content Object's payload:

$$\text{private\_key} = f_{private}(\text{session\_id}, \text{secret}) \quad (8)$$

The functions $f_{session}$, $f_{public}$, and $f_{private}$ can include any function that generates a cryptographic key, such as a hash function.

To generate a secure Interest, the client device determines a public key that was received from the content producer (operation 708), and uses the content producer's public key to encrypt the plaintext suffix as well as the client device's encryption key (e.g., a symmetric session key or a public key) (operation 710). The client device can generate the Interest so that the Interest's name includes the routable prefix and the encrypted name suffix (operation 712). For example, the Interest's name can have the form:

$$/\text{routable\_prefix}/\text{session\_id}/\text{encrypted\_suffix} \quad (9)$$

The client device can disseminate the Interest over a named-data network to obtain the desired content from the content producer (operation 714). Once the content producer receives the Interest, the content producer can use a local private key to decrypt the Interest's encrypted suffix, and uses the key it obtains from the Interest to encrypt a Content Object for the client device.

Figure 7B:
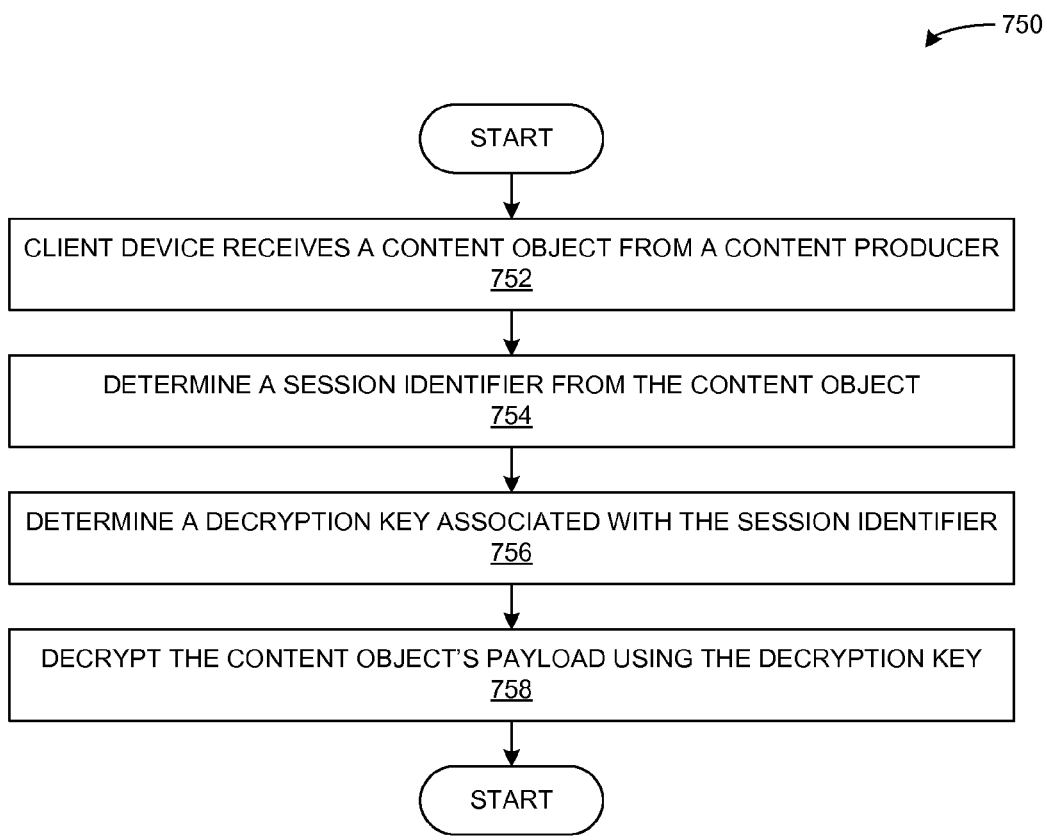
FIG. 7B presents a flow chart illustrating a method for using a local private key to process a Content Object that includes an encrypted name in accordance with an embodiment.

FIG. 7B presents a flow chart illustrating a method 750 for using a local private key to process a Content Object that includes an encrypted name in accordance with an embodiment. Specifically, the client device can receive a Content Object that satisfies an Interest that was disseminated by the client device (operation 752). The client device can use the Content Object's encrypted name to determine which application generated the initial request for the Interest. The client device can also decrypt the Content Object's payload by obtaining a session identifier from the Content Object's name (operation 754), and using the session identifier to determine a decryption key (e.g., a private key or a symmetric session key) that corresponds to the Content Object (operation 756). The client device decrypts the Content Object's payload using the session key (operation 758).

In some embodiments, during operation 756, the client device can obtain a stored decryption key that corresponds to the session identifier. Alternatively, the client device can use a hash function to generate the decryption key when necessary at runtime. For example, the client device can use a function $f_{session}$ to generate a symmetric session key based on the session identifier, as presented under expression (6). If the client device is using a public/private key pair, the client device can use a function $f_{private}$ to generate the private key based on the session identifier and a secret as presented in expression (8). The secret value can be persistent over a period of time, and can be used across various sessions with one or more content producers. For example, the client device can generate a new secret value each time the computer is turned on. Alternatively, the client device can generate a secret value for each active interface, for example, as a part of a setup procedure that initializes or activates the interface.

Figure 8:
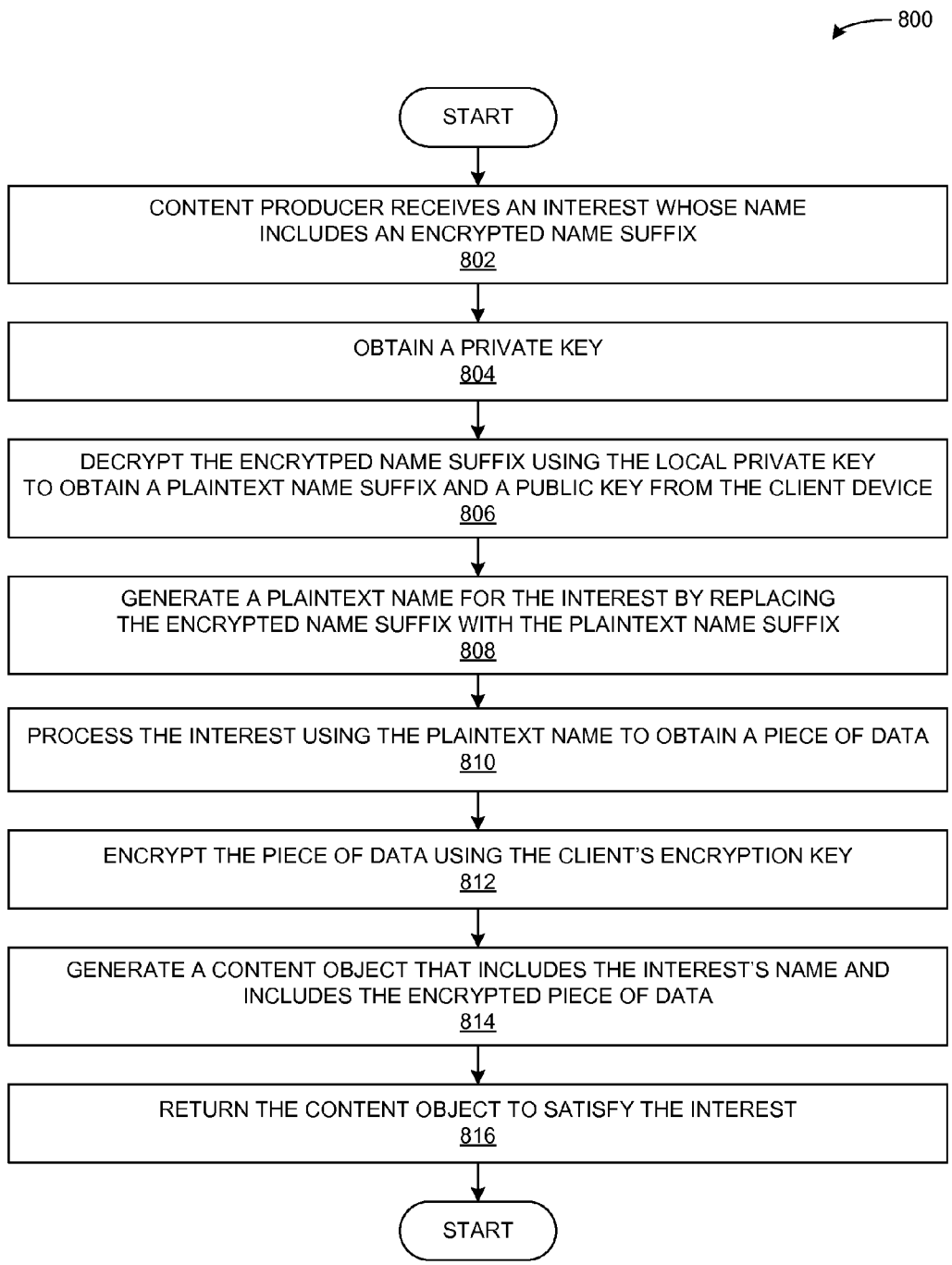
FIG. 8 presents a flow chart illustrating a method for using a client-generated public key to generate a Content Object that satisfies an Interest with an encrypted name in accordance with an embodiment.

FIG. 8 presents a flow chart illustrating a method 800 performed by a content producer to use a client-generated public key to generate a Content Object that satisfies an Interest with an encrypted name in accordance with an embodiment. During operation, the content producer can receive an Interest whose name includes an encrypted suffix (operation 802). To process the Interest, the content producer obtains a private key (operation 804), and decrypts the encrypted suffix using the local private key to obtain a plaintext name suffix as well as an encryption key from the client device (operation 806). This encryption key may include, for example, a symmetric session key, or an asymmetric public key.

In some embodiments, the content producer can generate a plaintext name by replacing the encrypted suffix with the plaintext suffix (operation 808), and processes the Interest using the plaintext name to obtain or generate a piece of data (operation 810). Alternatively, the content producer does not need to generate the plaintext name to process the Interest. For example, the content producer may obtain or generate the piece of data based on the plaintext suffix (without generating the full plaintext name).

The content producer then encrypts the piece of data using the encryption key that it obtained from the Interest's encrypted suffix (operation 812), and generates a Content Object that includes the Interest's name and includes the encrypted piece of data (operation 814). The Content Object's name includes the name from the Interest that includes the encrypted suffix, which allows routing nodes along a path traversed by the Interest to use the Content Object's name to find a matching entry in a local PIT. The content producer then returns the Content Object to satisfy the Interest (operation 816).

Figure 9:
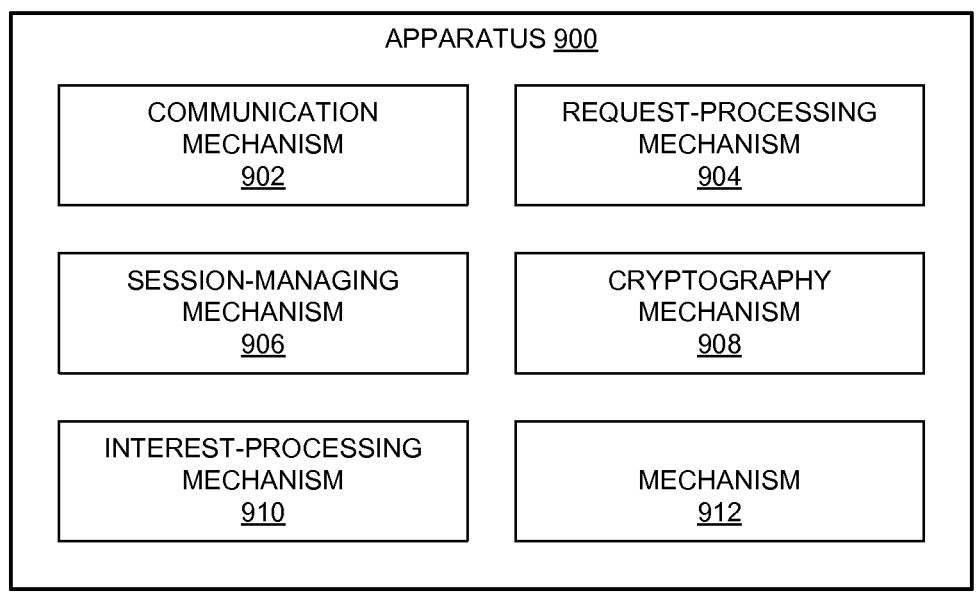
FIG. 9 illustrates an exemplary apparatus that facilitates using Interest and Content Objects with encrypted names to protect a user's privacy in accordance with an embodiment.

FIG. 9 illustrates an exemplary apparatus 900 that facilitates using Interest and Content Objects with encrypted names to protect a user's privacy in accordance with an embodiment. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a communication mechanism 902, a session-managing mechanism 904, a request-processing mechanism 906, a cryptography mechanism 908, an Interest-processing mechanism 910, and a Content Object processing mechanism 912.

In some embodiments, communication mechanism 902 can send and/or receive Interests and Content Objects over a named-data network (NDN), such as a content centric network (CCN). Session-managing mechanism 904 can establish a session with a remote device over the NDN or CCN. Request-processing mechanism 906 can obtain a request for data from a local user or application, and determines whether the request can be satisfied locally, or needs to be disseminated across an NDN or CCN. Cryptography mechanism 908 can determine an encryption key that corresponds to a session with a remote computer system, and encrypts the name suffix associated with the request using the session encryption key.

Interest-processing mechanism 910 can generate or process an incoming Interest an Interest whose name includes a routable prefix to the remote computer system, and includes the encrypted suffix. Content Object processing mechanism 912 can generate a Content Object or process an incoming Content Object that includes an encrypted suffix, and includes an encrypted payload.

Figure 10:
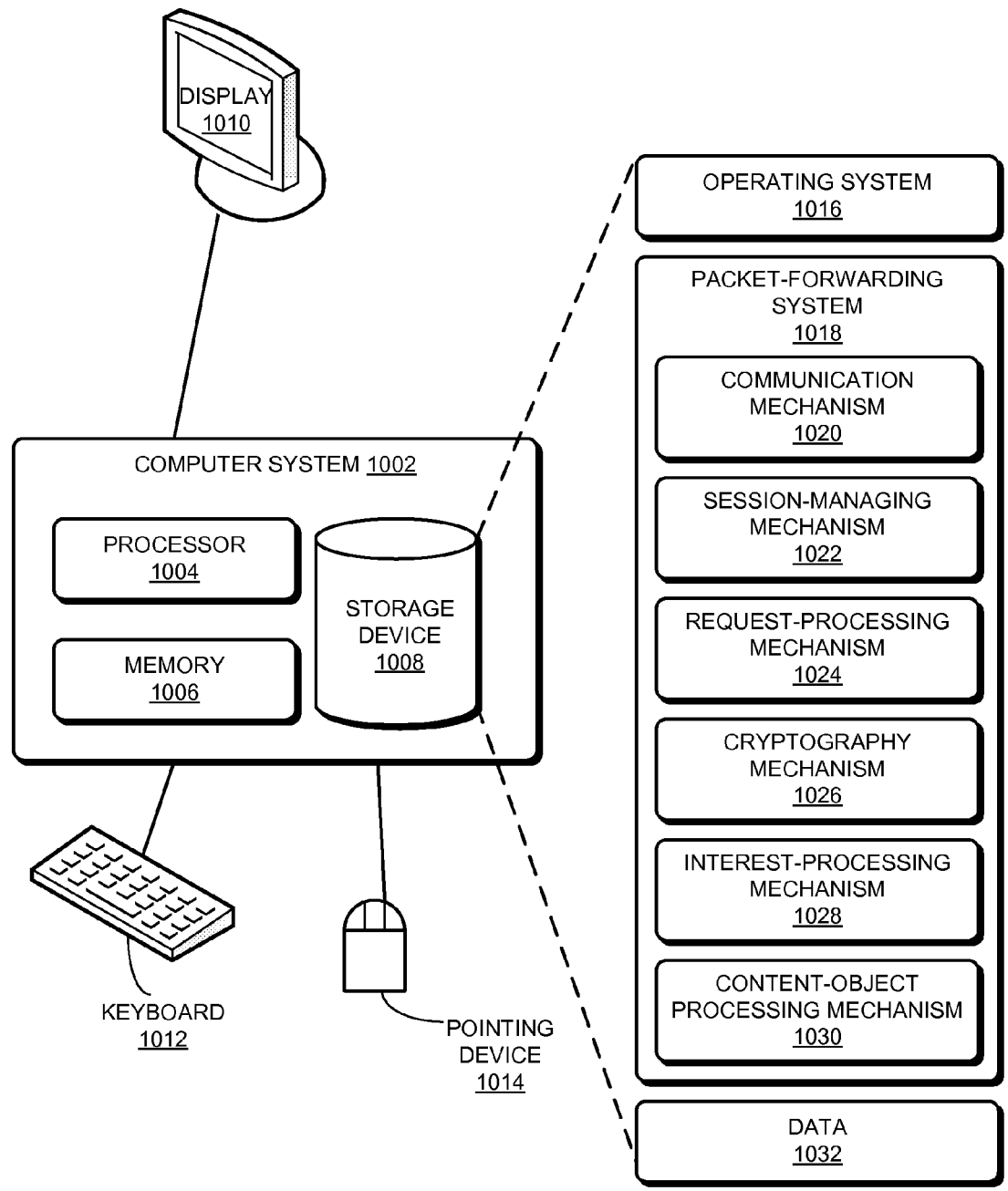
FIG. 10 illustrates an exemplary computer system that facilitates using Interest and Content Objects with encrypted names to protect a user's privacy in accordance with an embodiment.

FIG. 10 illustrates an exemplary computer system 1002 that facilitates using Interest and Content Objects with encrypted names to protect a user's privacy in accordance with an embodiment. Computer system 1002 includes a processor 1004, a memory 1006, and a storage device 1008. Memory 1006 can include a volatile memory (e.g., RAM) that serves as a managed memory, and can be used to store one or more memory pools. Furthermore, computer system 1002 can be coupled to a display device 1010, a keyboard 1012, and a pointing device 1014. Storage device 1008 can store operating system 1016, transport-security system 1018, and data 1032.

Transport-security system 1018 can include instructions, which when executed by computer system 1002, can cause computer system 1002 to perform methods and/or processes described in this disclosure. Specifically, transport-security system 1018 may include instructions for sending and/or receiving Interests and Content Objects over a named-data network (NDN), such as a content centric network (CCN) (communication mechanism 1020). Further, transport-security system 1018 can include instructions for establishing a session with a remote device over the NDN or CCN (session-managing mechanism 1022). Transport-security system 1018 can also include instructions for obtaining a request for data from a local user or application, and determining whether the request can be satisfied locally, or needs to be disseminated across an NDN or CCN (request-processing mechanism 1024).

Transport-security system 1018 may also include instructions for determining an encryption key that corresponds to a session with a remote computer system, and encrypting the name suffix associated with the request using the session encryption key (cryptography mechanism 1026). Further, transport-security system 1018 can include instructions for generating an Interest or processing an incoming Interest whose name includes a routable prefix to the remote computer system, and includes the encrypted suffix (Interest-processing mechanism 1028). Transport-security system 1018 can also include instructions for generating a Content Object or processing an incoming Content Object that includes an encrypted suffix, and includes an encrypted payload (Content Object processing mechanism 1030).

Data 1032 can include any data that is required as input or that is generated as output by the methods and/or processes described in this disclosure. Specifically, data 1032 can store at least session identifiers for one or more active sessions, cryptographic keys (e.g., a session key, or a public/private key pair) for one or more active sessions, and/or a secret value that facilitates generating cryptographic keys for one or more active sessions.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, the method comprising:
receiving, by a content-producing system via a content-centric network (CCN), a first Interest packet having a name that includes a serialized public key or digital certificate having the public key from a client device;
generating, by the content-producing system, a session identifier and a symmetric session key for a new session with the client device over the CCN;

generating an encrypted Content Object that includes at least the session identifier, the symmetric session key, and a digital certificate for the content-producing system, wherein the encrypted Content Object is encrypted using the public key from the first Interest packet, and signed according to the digital certificate of the content-producing system; and returning the encrypted Content Object over the CCN to the client device;

receiving a resume-setup second Interest packet that includes the session identifier and the digital certificate of the client device;

decrypting the digital certificate using the symmetric session key;

authenticating the client device using the digital certificate; and in response to receiving a third Interest packet with the session identifier:

decrypting an encrypted name suffix of the third Interest packet's name, using the symmetric session key to obtain a plaintext name suffix; and using the plaintext name suffix to obtain a piece of data that corresponds to the third Interest packet's name, encrypting the piece of data using the symmetric session key, and returning a Content Object that includes the encrypted piece of data over the CCN.

2. The method of claim 1, wherein using the plaintext name suffix to obtain the piece of data involves:

obtaining the piece of data that corresponds to the third Interest packet's name from a local repository or via the CCN.

3. The method of claim 1, wherein the session identifier is signed using a private key of the client device, and wherein authenticating the client device further involves using the client device's public key to authenticate the signed session identifier.

4. A non-transitory computer-readable storage medium storing instructions that when executed by a computer cause the computer to perform a method, the method comprising:

receiving, by a content-producing system over a content-centric network (CCN), a first Interest packet having a name that includes a serialized public key or digital certificate having the public key from a client device;

generating, by the content-producing system, a session identifier and a symmetric session key for a new session with the client device over the CCN;

generating an encrypted Content Object that includes at least the session identifier, the symmetric session key, and a digital certificate for the content-producing system, wherein the encrypted Content Object is encrypted using the public key from the first Interest packet, and signed according to the digital certificate of the content-producing system; and returning the encrypted Content Object over the CCN to the client device;

receiving a resume-setup second Interest packet that includes the session identifier and the digital certificate of the client device;

decrypting the digital certificate using the symmetric session key;

authenticating the client device using the digital certificate; and in response to receiving a third Interest packet that includes the session identifier:

decrypting an encrypted name suffix of the third Interest packet's name, using the symmetric session key to obtain a plaintext name suffix; and using the plaintext name suffix to obtain a piece of data that corresponds to the third Interest packet's name, encrypting the piece of data using the symmetric session key, and returning a Content Object that includes the encrypted piece of data over the CCN.

5. The storage medium of claim 4, wherein using the plaintext name suffix to obtain the piece of data involves:

obtaining the piece of data that corresponds to the third Interest packet's name from a local repository or via the CCN.

6. The storage medium of claim 4, wherein the session identifier is signed using a private key of the client device, and wherein authenticating the client device further involves using the client device's public key to authenticate the signed session identifier.

7. A computer-implemented method, the method comprising:

receiving, by a content-producing system from a client device via a content-centric network (CCN), a first Interest packet that includes a name of a digital certificate of the content-producing system; and in response to receiving the first Interest packet:

returning, via the content centric network, a Content Object that includes the digital certificate of the content-producing system; and receiving a second Interest packet having a name that includes a temporary symmetric key from the client device, wherein the temporary symmetric key is encrypted using the public key of the content-producing system;

generating, by the content-producing system, a session identifier and an encryption key for the session with the client device;

generating an encrypted Content Object that satisfies the second Interest packet and includes at least the session identifier, the encryption key for the session, and a digital certificate of the content-producing system, wherein the encrypted Content Object is encrypted using the temporary symmetric key from the client device, and wherein the encrypted Content Object is signed according to the digital certificate of the content-producing system;

returning the encrypted Content Object over the CCN to satisfy the second Interest packet;

receiving a resume-setup third Interest packet that includes the session identifier and a public key certificate of the client device;

obtaining a decryption key;

decrypting the client device's public key certificate from the resume-setup the Interest packet, using the decryption key;

authenticating the client device using the public key certificate; and in response to receiving a fourth Interest packet that includes a routable prefix associated with the content-producing system, the session identifier, and an encrypted name suffix storing a name for a piece of data or a service requested by the client device:

decrypting the encrypted name suffix of the fourth Interest packet's name, using the decryption key to obtain a plaintext name suffix; and using the plaintext name suffix to obtain a piece of data that corresponds to the fourth Interest packet's name, encrypting the piece of data using the encryption key or a public key of the client device, and returning a Content Object that includes the encrypted piece of data over the CCN to satisfy the fourth Interest packet.

8. The method of claim 7, wherein the content-producing system's encryption key and decryption key include one or more of:
    a symmetric session key; and
    an asymmetric public encryption key and private decryption key pair.

9. The method of claim 7, wherein obtaining the decryption key involves generating the decryption key based on one or more of:
    the session identifier; and
    a secret value.

10. The method of claim 7, wherein using the plaintext name suffix to obtain the piece of data involves:
    obtaining the piece of data that corresponds to the fourth Interest packet's name from a local repository or via the CCN.

11. An apparatus to process an encrypted request received over a named-data network, the apparatus comprising:
    a processor; and
    a memory storing instructions that when executed by the processor cause the apparatus to:
    receive, from a client device via a content-centric network (CCN), a first Interest packet that includes a name of a digital certificate of a content-producing system; and
    in response to receiving the first Interest packet:
        return, via the content centric network, a Content Object that includes the digital certificate of the content-producing system; and
        receive a second Interest packet having a name that includes a temporary symmetric key from the client device, wherein the temporary symmetric key is encrypted using the public key of the content-producing system;
    generate a session identifier and an encryption key for the session with the client device;
    generate an encrypted Content Object that satisfies the second Interest packet, and includes at least the session identifier, the encryption key for the session, and a digital certificate of the content-producing system, wherein the encrypted Content Object is encrypted using the temporary symmetric key from the client device, and wherein the encrypted Content Object is signed according to the digital certificate of the content-producing system;
    return, via the CCN, the encrypted Content Object to satisfy the second Interest packet;
    receiving a resume-setup third Interest packet that includes the session identifier and a public key certificate of the client device;
    obtaining a decryption key;
    decrypting the client device's public key certificate from the resume-setup third Interest packet, using the decryption key;
    authenticating the client device using the public key certificates; and
    in response to receiving a fourth Interest packet that includes a routable prefix associated with the content-producing system, the session identifier, and an encrypted name suffix storing a name for a piece of data or a service requested by the client device:
        decrypt the encrypted name suffix of the fourth Interest packet's name, using the decryption key to obtain a plaintext name suffix; and
        using the plaintext name suffix to obtain a piece of data that corresponds to the fourth Interest packet's name, encrypting the piece of data using the encryption key or a public key of the client device, and returning a Content Object that includes the encrypted piece of data over the CCN to satisfy the fourth Interest packet.

12. The apparatus of claim 11, wherein the content-producing system's encryption key and decryption key include one or more of:
    a symmetric session key; and
    an asymmetric public encryption key and private decryption key pair.

13. The apparatus of claim 11, wherein executing the instructions further cause the apparatus to generate the decryption key based on one or more of:
    the session identifier; and
    a secret value.

14. The apparatus of claim 11, wherein using the plaintext name suffix to obtain the piece of data involves:
    obtaining the piece of data that corresponds to the fourth Interest packet's name from a local repository or via the CCN.

* * * * *